(12) United States Patent
Billaud et al.

(10) Patent No.: US 9,019,826 B2
(45) Date of Patent: Apr. 28, 2015

(54) HIERARCHICAL ALLOCATION OF NETWORK BANDWIDTH FOR QUALITY OF SERVICE

(71) Applicant: WMware Inc., Palo Alto, CA (US)

(72) Inventors: Jean-Pascal Billaud, Walnut Creek, CA (US); Ajay Gulati, Palo Alto, CA (US)

(73) Assignee: VMare, Inc., Palo Alto, CA (US)

( * ) Notice: Subject to any disclaimer, the term of this patent is extended or adjusted under 35 U.S.C. 154(b) by 212 days.

(21) Appl. No.: 13/889,245

(22) Filed: May 7, 2013

(65) Prior Publication Data

US 2014/0334301 A1    Nov. 13, 2014

(51) Int. Cl.
  *G06F 11/00*   (2006.01)
  *H04J 1/16*    (2006.01)
  *H04L 1/00*    (2006.01)
  *H04L 12/26*   (2006.01)
  *H04L 12/911*  (2013.01)

(52) U.S. Cl.
  CPC .................................... *H04L 47/782* (2013.01)

(58) Field of Classification Search
  CPC ..................................................... H04L 47/782

USPC .............. 370/229, 230, 230.1, 231–235, 254, 370/255, 256
See application file for complete search history.

(56) References Cited

U.S. PATENT DOCUMENTS

| 2010/0312941 | A1* | 12/2010 | Aloni et al. | 710/310 |
| 2014/0056149 | A1* | 2/2014 | Mani et al. | 370/235.1 |
| 2014/0258535 | A1* | 9/2014 | Zhang | 709/226 |
| 2014/0269750 | A1* | 9/2014 | Tsirkin | 370/413 |
| 2014/0297864 | A1* | 10/2014 | Zhang et al. | 709/226 |

* cited by examiner

*Primary Examiner* — Chuong T Ho

(57) ABSTRACT

Network bandwidth is allocated to virtual machines (VMs) according to a node hierarchy that includes a root node, intermediate nodes, and leaf nodes, wherein each leaf node represents a queue of packet transmission requests from a VM and each intermediate node represents a grouping of leaf queues. As VMs generate requests to transmit packets over the network, the network bandwidth is allocated by queuing packets for transmission in the leaf nodes, and selecting a leaf node from which a packet is to be transmitted based on tracking data that represent how much network bandwidth has been allocated to the nodes. Upon selecting the leaf node, the tracking data of the selected leaf node and the tracking data of an intermediate node that is a parent node of the selected leaf node are updated, and a command to transmit the packet of the selected leaf node is issued.

20 Claims, 8 Drawing Sheets

```
Algorithm 1: Enqueue packet
1 EnQueuePacket (queue q, packet p)
2   append packet to the q
3   if q was idle then
4     ActivateQueue(q)
5   ScheduleRequest()
```

FIGURE 8A

```
Algorithm 2: Activate Queue
1  ActivateQueue (queue q)
2    let T be the current real time
3    let p_q be the parent of q
4
5    Rq = max{Rq, T} /* reservation tag */
6    Lq = max{Lq, T} /* limit tag */
7    Sq = max{Sq, min(∀_resiblings Sr)} /* shares tag */
8    add q to global reservation minHeap
9    add q to p_q's shares and limit minHeap
10   if p_q was idle then
11     ActivateQueue(p_q)
```

FIGURE 8B

```
Algorithm 3: Scheduling Process
1 let max_inflight = maximum allowed outstanding bytes
2 let inflight be the current outstanding bytes
3
4 ScheduleRequest ()
5   while inflight ≤ max_inflight do
6     q = FindEligibleQueue()
7     p = DeQueuePacket(q)
8     inflight += packetLength of p
9     send p to the device for transmit
```

FIGURE 8C

```
Algorithm 4: Queue Eligibility
 1  FindEligibleQueue ()
 2     let E be the set of queues with Rq and Lq ≤ T
 3     if E is not empty then
 4        let q be the queue with the minimum Rq
 5        flag q and ancestors as eligible for reservation
 6     else
 7        let q be the root of the hierarchy
 8     return FindEligibleQueueBasedOnShares(q)
 9
10  FindEligibleQueueBasedOnShares (queue q)
11     if q is a leaf then
12        return q
13     let E_c be the set of q's children whose Lc ≤ T
14     if E_c is empty then
15        return nil
16     let c be the child queue of q with minimum Sc
17     return FindEligibleQueueBasedOnShares(c)
```

FIGURE 8D

```
Algorithm 5: Dequeue Packet
 1  DeQueuePacket (queue q)
 2     pop first packet p from the queue q
 3     let packetLen be the length of the packet
 4     BillHierarchy(q, packetLen, q is idle?)
 5     return p
```

FIGURE 8E

```
Algorithm 6: Request billing process
 1  BillHierarchy (queue q, int packetLen, bool isIdle)
 2     let p_q be the parent node of q
 3     if q is eligible for reservation then
 4        Rq+ = packetLen/rq  /* reservation tag */
 5        if use MAX(R,S) semantics then
 6           Sq+ = packetLen/sq  /* shares tag */
 7     else
 8        Sq+ = packetLen/sq  /* shares tag */
 9     Lq+ = Lq + packetLen/lq
10     if isIdle = true then
11        remove q from all minHeaps
12     BillHierarchy(p_q, packetLen, p_q is idle?)
```

FIGURE 8F

HIERARCHICAL ALLOCATION OF NETWORK BANDWIDTH FOR QUALITY OF SERVICE

BACKGROUND

Virtual computing environments allow multiple virtual machines (VMs) to run on a single physical platform and to share physical resources (e.g., hardware) of the physical platform. VMs may be based on specifications of a hypothetical computer or emulate the computer architecture and functions of a real world computer. A typical physical platform or server, also referred to as a host computer or host, in which VMs are instantiated includes central processing units (CPUs), random access memory (RAM), network interface cards (NICs), and host bus adapters (HBAs) for storage access. Larger servers bring economies of scale to virtualized datacenters, where tens to hundreds of VMs are packed on a single server, to lower cost and increase utilization.

A hypervisor and virtual machine monitors (VMMs) implemented within the hypervisor supports the execution of VMs. The hypervisor controls sharing of the physical resources between VMs. To manage CPU resources and memory resources, schedulers in hypervisors may implement some form of weight based allocation to give priority to latency sensitive VMs. Unfortunately, techniques for managing CPU resources and memory resources are not directly applicable to scheduling of the network bandwidth available through the NICs.

Instead, a conventional packet scheduler of a hypervisor, which is implemented to manage scheduling of the network bandwidth, may follow a Quality of Service (QoS) model that specifies a guaranteed throughput for each VM. By using the QoS model, the hypervisor attempts to provide a guarantee that latency will not exceed a specified level for a particular VM or VMs. In some examples, traffic shapers may be used to enforce limits and/or weight-based allocation. When weight-based allocation is employed, network bandwidth can be provided according to the guarantee so long as the available network bandwidth remains high or constant. In situations where the available network bandwidth is low or fluctuates, the weights may need to be adjusted in order for the guarantee to be met.

Conventional packet schedulers have been sufficient mainly because networks were usually over-provisioned and physical NIC saturation at servers were not common. However, that trend has been changing rapidly due to several reasons. First, consolidation ratios per server have increased due to higher server processing core counts and larger memory sizes. It has been observed that two processing cores can easily saturate a 10-gigabit per second (Gbps) NIC using a packet size of 1 kilobyte (KB) or higher. Second, in situations where storage is accessed through the NIC such as in network-attached storage (NAS) systems, storage performance has increased due to improved solid-state drives (SSDs). With the adoption of SSDs in storage arrays, input-output operations per second (IOPS) are no longer limited by poor random I/O performance of disks and high hit rates (≥95%) in SSD tiers have resulted in a significant increase in bandwidth consumption of the NIC. Third, management traffic is consuming significant bandwidth in virtual environments when carrying out management applications such as live migration of VMs and virtual disks. Fourth, converged storage architectures are becoming common, where local storage across servers is stitched together to provide a shared storage device that is made accessible through the NIC. Accordingly, increased consumption of physical resources that are available over a network has caused a need to provide better packet scheduling at physical NICs on host computers.

SUMMARY

Embodiments provide a Quality of Service (QoS) model for scheduling of packets transmitted through physical NICs in a manner that supports hierarchical allocation, minimum guarantees or reservations, maximum limits, and prioritized allocation of spare bandwidth based on weights or shares.

According to one embodiment, network bandwidth is allocated to virtual machines or other bandwidth consumers according to a node hierarchy that includes a root node, intermediate nodes, and leaf nodes, wherein each leaf node represents a queue (or queues) of packet transmission requests from one of the virtual machines or other bandwidth consumers and each intermediate node represents a grouping of one or more leaf queues. As virtual machines or other bandwidth consumers generate requests to transmit data packets over the network, the network bandwidth is allocated by queuing data packets for transmission in the leaf nodes, and selecting a leaf node from which a data packet is to be transmitted based on bandwidth allocation data of the nodes, which include tracking data that represent how much network bandwidth has been allocated to the nodes. Upon selecting the leaf node, the tracking data of the selected leaf node and the tracking data of an intermediate node that is a parent node of the selected leaf node are updated, and a command to transmit the data packet of the selected leaf node through the NICs is issued.

Further embodiments include, without limitation, a non-transitory computer-readable storage medium that includes instructions that enable a computer system to implement one or more aspects of the above method as well as a computer system configured to implement one or more aspects of the above method.

BRIEF DESCRIPTION OF THE DRAWINGS

FIGS. 8A-8F are pseudo codes corresponding to the methods of FIGS. 3-7.

DETAILED DESCRIPTION

Figure 1:
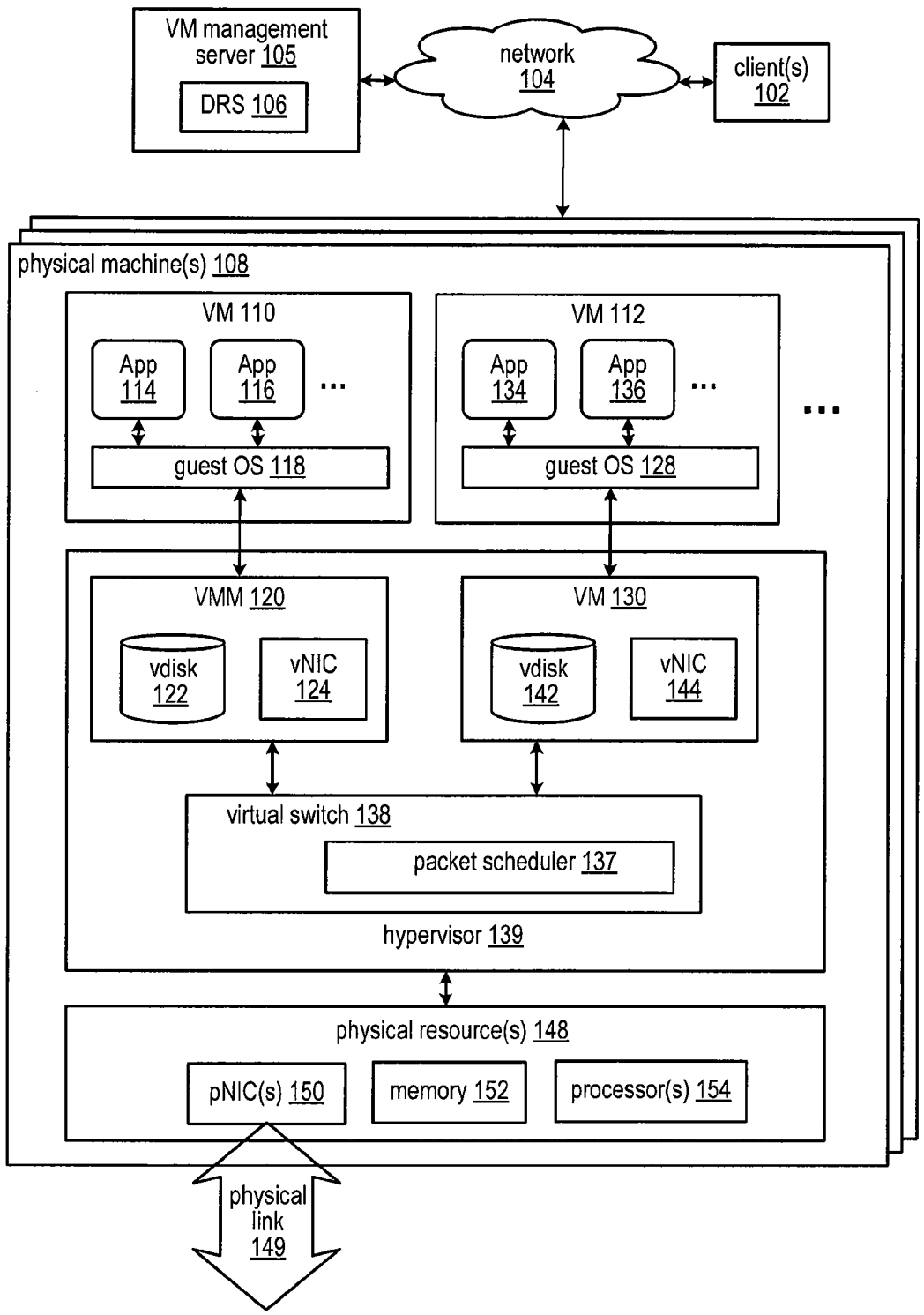
FIG. 1 is a conceptual diagram of a virtualized computer system in which one or more embodiments may be implemented.

FIG. 1 is a conceptual diagram of a virtualized computer system in which one or more embodiments may be implemented. The virtualized computer system includes a network 104 that connects one or more clients 102, one or more physical machines 108, and a VM management server 105, among other devices. An example of a physical machine 108 is a server computer, in which one or more virtual machines are executed. In the example illustrated, physical machine 108 includes physical resources 148 such as one or more physical NICs (pNIC) 150 connected to other physical machines and to network 104 through a physical link 149, memory 152 (e.g., RAM), and processors 154 (e.g., CPUs). Virtual machine management server 105 controls VM configuration and VM power on/off in the physical machines and has a resource management software module running therein (depicted in FIG. 1 as distributed resource scheduler (DRS) 106) to allocate hardware resources to the VMs and also perform load balancing on the hardware resources across the VMs.

Physical machine 108 includes hypervisor 139 that is installed on top of physical resources 148. Hypervisor 139 is a virtualization software component that makes possible the concurrent instantiation and execution of one or more virtual machines (VMs) 110, 112. Hypervisor 139 includes virtual machine monitors (VMMs) 120, 130, each emulating hardware resources for a corresponding one of VMs. For example, in FIG. 1, VMM 120 emulates hardware resources, e.g., virtual disk 122 and virtual NIC 124, for VM 110 and VMM 130 emulates hardware resources, e.g., virtual disk 142 and virtual NIC 144, for VM 112. Each VM has a guest operating system (OS) (e.g., guest OS 118, 128) implemented therein that provides guest applications running in the VM (e.g., Apps 114, 116 executed on guest OS 118 and Apps Apps 134, 136 executed on guest OS 128) an interface to the virtual hardware resources. Examples of the guest OS include any of the well-known commodity operating systems, such as Microsoft Windows, Linux, and the like.

Hypervisor 139 also implements a virtual switch 138 that handles the forwarding of packets from vNIC 124, 144 to pNIC 150, and from pNIC 150 to vNIC 124, 144. A packet scheduler 137 is implemented in virtual switch 138, in particular one packet scheduler per network link provided in pNIC 150, according to embodiments, to handle scheduling of outbound packets from the VMs to be transmitted through pNIC 150 in such a manner that a Quality of Service (QoS) model that supports hierarchical network bandwidth allocation, minimum guarantees or reservations, maximum limits, and prioritized allocation of spare network bandwidth based on weights or shares, is followed.

It should be recognized that the various terms, layers and categorizations used to describe the virtualization components in FIG. 1 may be referred to differently without departing from their functionality or the spirit or scope of the invention. For example, VMMs 120, 130 may be considered separate virtualization components between VMs 110, 112 and hypervisor 139 (which, in such a conception, may itself be considered a virtualization "kernel" component), since there exists a separate VMM for each instantiated VM. Alternatively, each VMM may be considered to be a component of a corresponding virtual machine since such VMM includes the hardware emulation components for the virtual machine.

Figure 2:
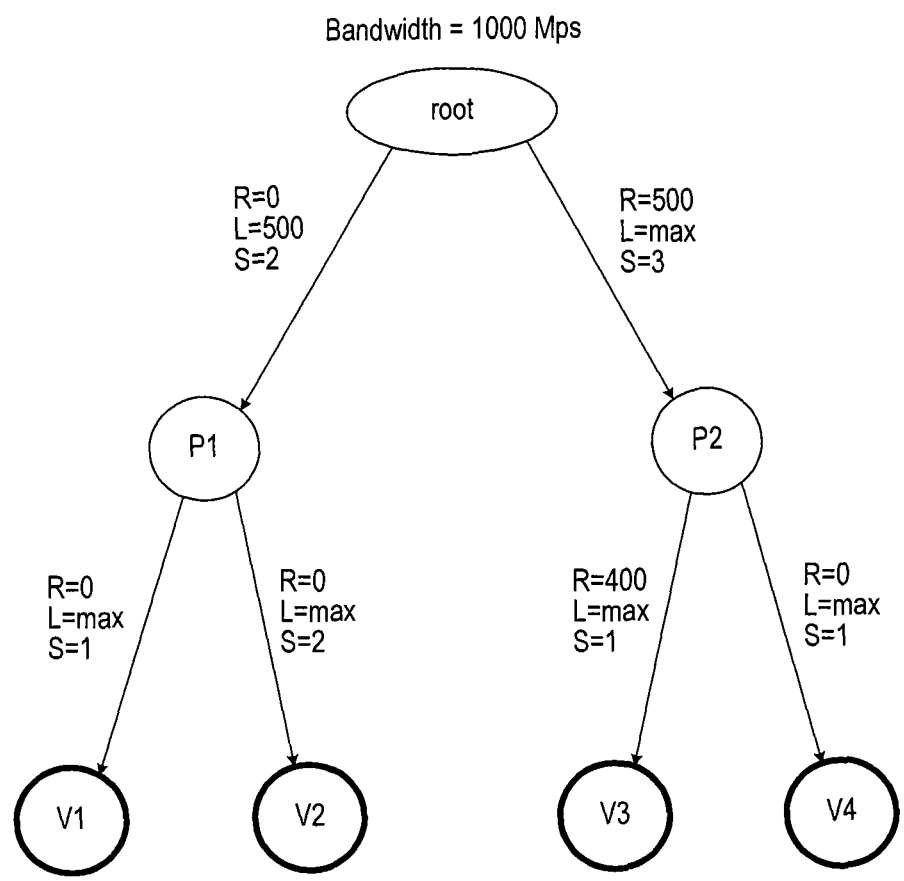
FIG. 2 is a diagram of a resource allocation hierarchy according to which network bandwidth is allocated in one or more embodiments.

FIG. 2 is a diagram of a resource allocation hierarchy according to which network bandwidth (or sometimes more simply referred to as "bandwidth") is allocated in one or more embodiments. The resource allocation hierarchy, as shown, includes a root node, two intermediate nodes, P1 and P2, which are parent nodes of leaf nodes V1, V2, V3, V4. Intermediate node P1 is a parent node for leaf nodes, V1 and V2. Intermediate node P2 is a parent node for leaf nodes, V3 and V4. Each of the leaf nodes represents a queue (or queues) of packet transmission requests from a different VM and is also referred to herein as a leaf queue, and each of the intermediate nodes represents a grouping of leaf queues and is also referred to herein as an intermediate queue.

The resource allocation model depicted herein defines three resource settings at each of the intermediate and leaf queues. The three resource settings are reservation, limit, and shares. The reservation setting of a queue defines the minimum bandwidth allocation that is guaranteed for the queue. The limit setting of a queue defines the maximum bandwidth that can be allocated to the queue. The share setting of a queue defines a bandwidth allocation priority that is to be given to the queue relative to other queue or queues sharing the same intermediate queue as a parent queue, the queues sharing the same parent queue being referred to herein as sibling queues. For example, if there are two sibling queues and the first has a share of 2 and the second has a share of 1, a spare bandwidth capacity of 300 Mbits/second (Mbps) would be divided up according to the shares, 200 Mbps to the first and 100 Mbps to the second.

Valid resource settings at a queue satisfy the following two constraints: (1) the reservation setting at a parent queue has to be greater than or equal to the sum of the reservation settings at its child queues; and (2) a limit setting at a queue cannot be less than the reservation setting at the queue. In addition, packet scheduler 137 allocates bandwidth according to the reservation setting. The allocation satisfies the following properties at every level of the hierarchy: (1) packet scheduler 137 allocates for each queue at least the reservation setting of the queue, and (2) packet scheduler 137 allocates for each queue at most the limit setting at the queue. Packet scheduler 137 allocates spare bandwidth left after satisfying reservations by taking into account shares according to one of two different semantics, which may be referred to as the MAX(R, S) semantic and the SUM(R, S) semantic. The selection between the two is indicated by a user configuration setting of packet scheduler 137.

According to the MAX(R, S) semantic, packet scheduler 137 performs overall allocation in proportion to shares while meeting the reservation and limit settings. For example, in the resource allocation hierarchy shown in FIG. 2, packet scheduler 137 divides a network bandwidth of 1000 Mbps in proportion to shares 2:3 among the queues P1 and P2, while also satisfying the reservation constraints (0 Mbps and 500 Mbps) and the limit constraints (500 Mbps and no limit). The result at the intermediate queues P1 and P2 are bandwidth allocations of 400 Mbps and 600 Mbps, respectively. Similarly, packet scheduler 137 further divides the 400 Mbps at queue P1 among the child queues V1 and V2 according to the ratio of the share settings 1:2. However, packet scheduler 137 divides 600 Mbps at queue P2 among the child queues V3 and V4 as 400 Mbps and 200 Mbps. Even though the child queues V3 and V4 should get 300 Mbps each based on the equal share settings, the queue V3 has a reservation of 400 Mbps that needs to be met.

According to the SUM(R, S) semantic, packet scheduler 137 first allocates bandwidth capacity to a parent queue based on the reservation settings of its child queues. Packet scheduler 137 then allocates the remaining capacity, if any, based on the share settings while respecting limit constraints. For example, in the resource allocation hierarchy shown in FIG. 2, packet scheduler 137 allocates to queue P1, 0+(1000−500)*⅖=200 Mbps, and to queue P2, 500+(1000−500)*⅗=800 Mbps. Accordingly, a queue gets the reservation setting thereof plus some of the spare bandwidth based on its share setting and the share setting(s) of any sibling queue(s).

Packet scheduler 137 performs transmission scheduling of packets in real-time by tracking and updating three tags per queue. The tags include a reservation tag, a limit tag, and a share tag. The values of these tags are examined when packet scheduler 137 determines what packets to schedule, and updated when the packets are scheduled, as described in further detail below. A reservation tag value for a particular queue that is less than the current time indicates that the queue has not yet been allocated its minimum bandwidth. A limit tag vale for a particular queue that is less than the current time indicates that the queue has not yet been allocated its maximum bandwidth. The value of the share tag for a particular queue is compared against the value(s) of the share tag(s) of any sibling queue(s). The one with the lower share tag value is given allocation priority.

When a packet is scheduled, packet scheduler 137 updates the tag values that are maintained for the leaf queue of the packet and also the tag values that are maintained for ancestor queues of the leaf queue. In general, the tag values are updated with increased values that reflect the amount of bandwidth that would be consumed by the packet when the packet is eventually transmitted by pNIC 150.

Figure 3:
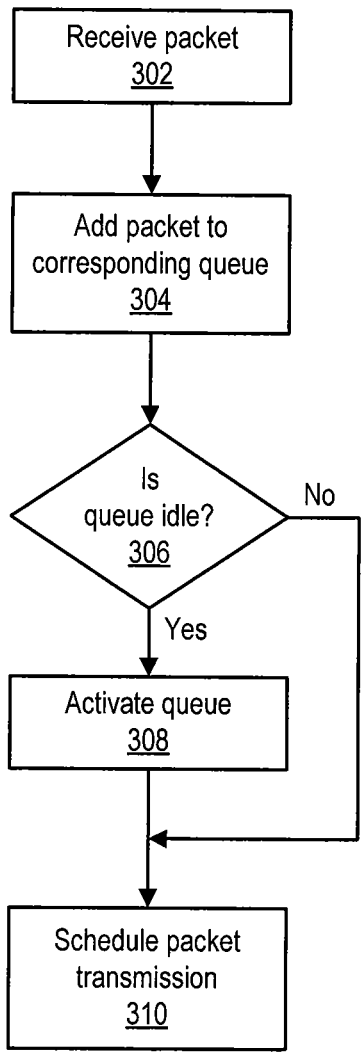
FIG. 3 is a flow diagram that depicts the steps of a method for queuing packets for scheduling according to an embodiment.
Figure 4:
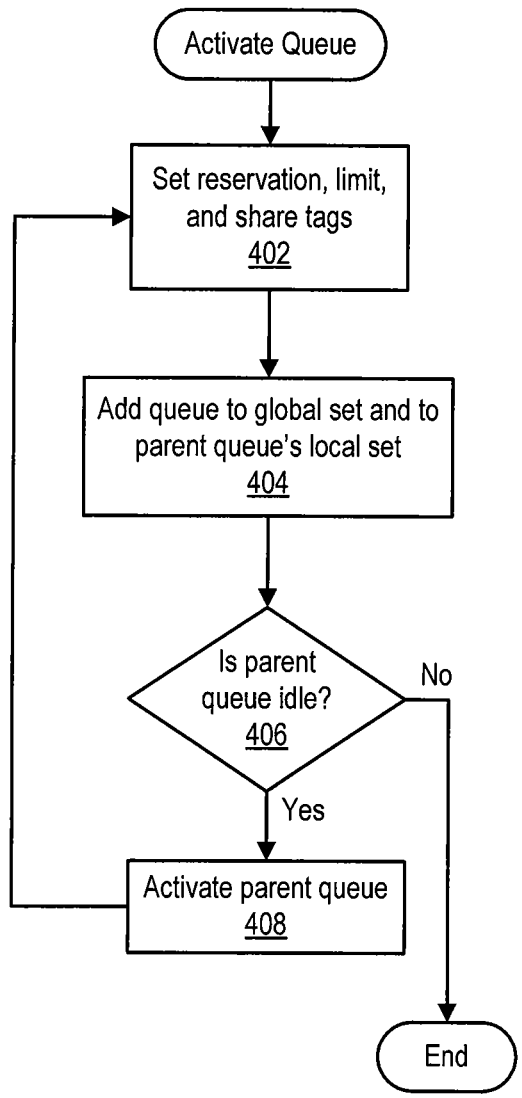
FIG. 4 is a flow diagram that depicts the steps of a method for activating queues according to an embodiment.
Figure 5:
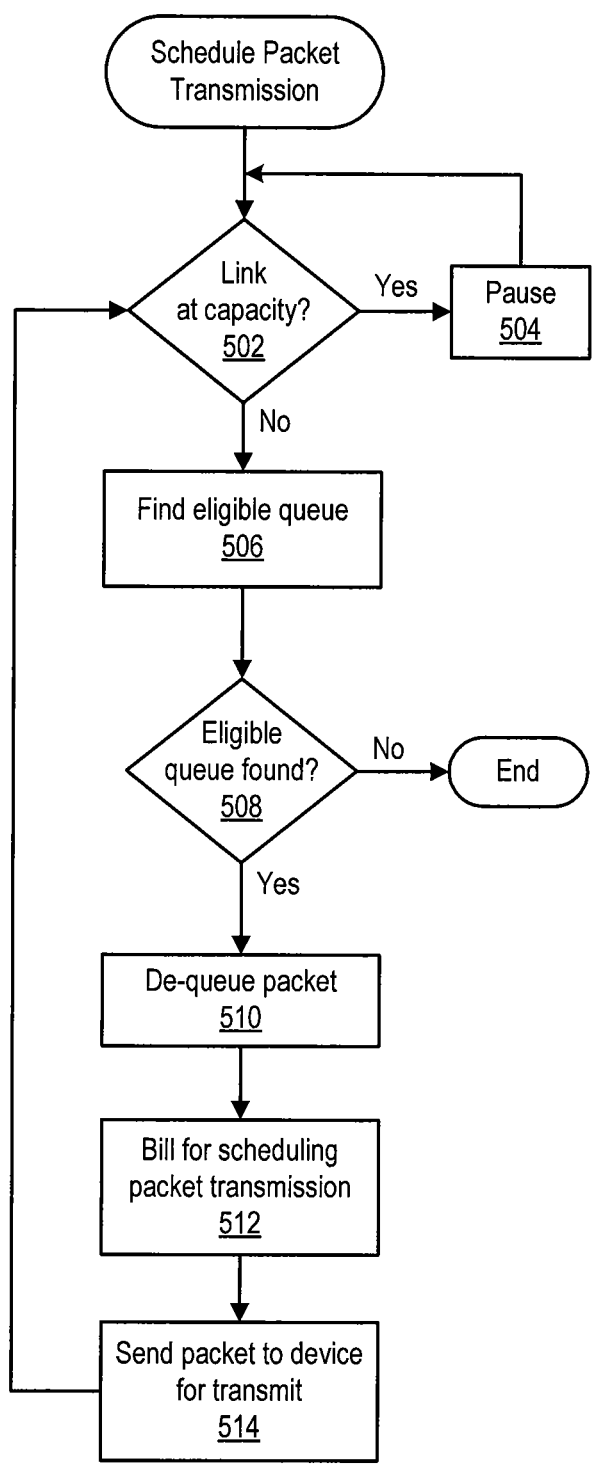
FIG. 5 is a flow diagram that depicts the steps of a method for scheduling a packet for transmission according to an embodiment.
Figure 6:
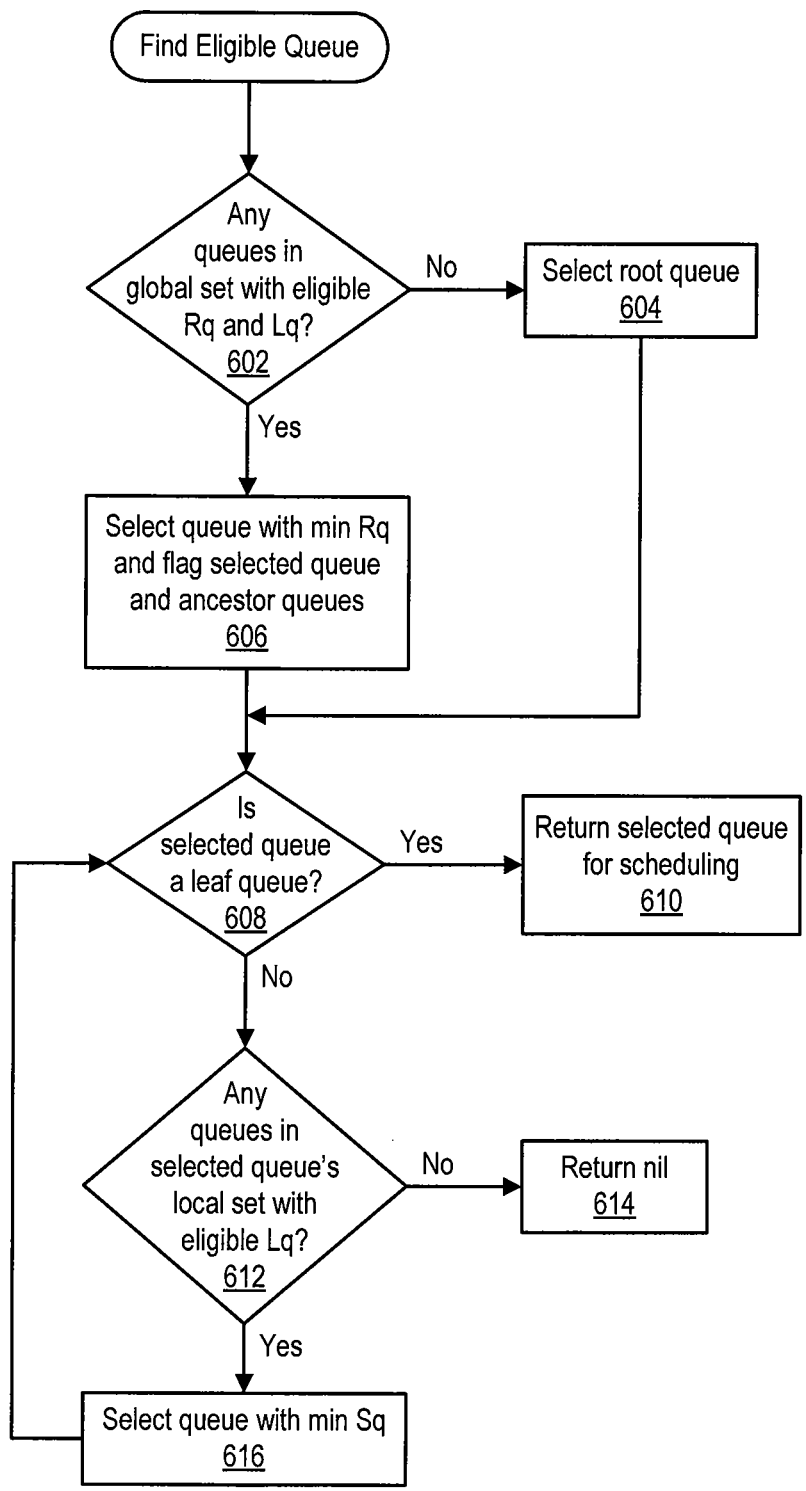
FIG. 6 is a flow diagram that depicts the steps of a method for selecting a queue from which a packet will be scheduled for transmission according to an embodiment.
Figure 7:
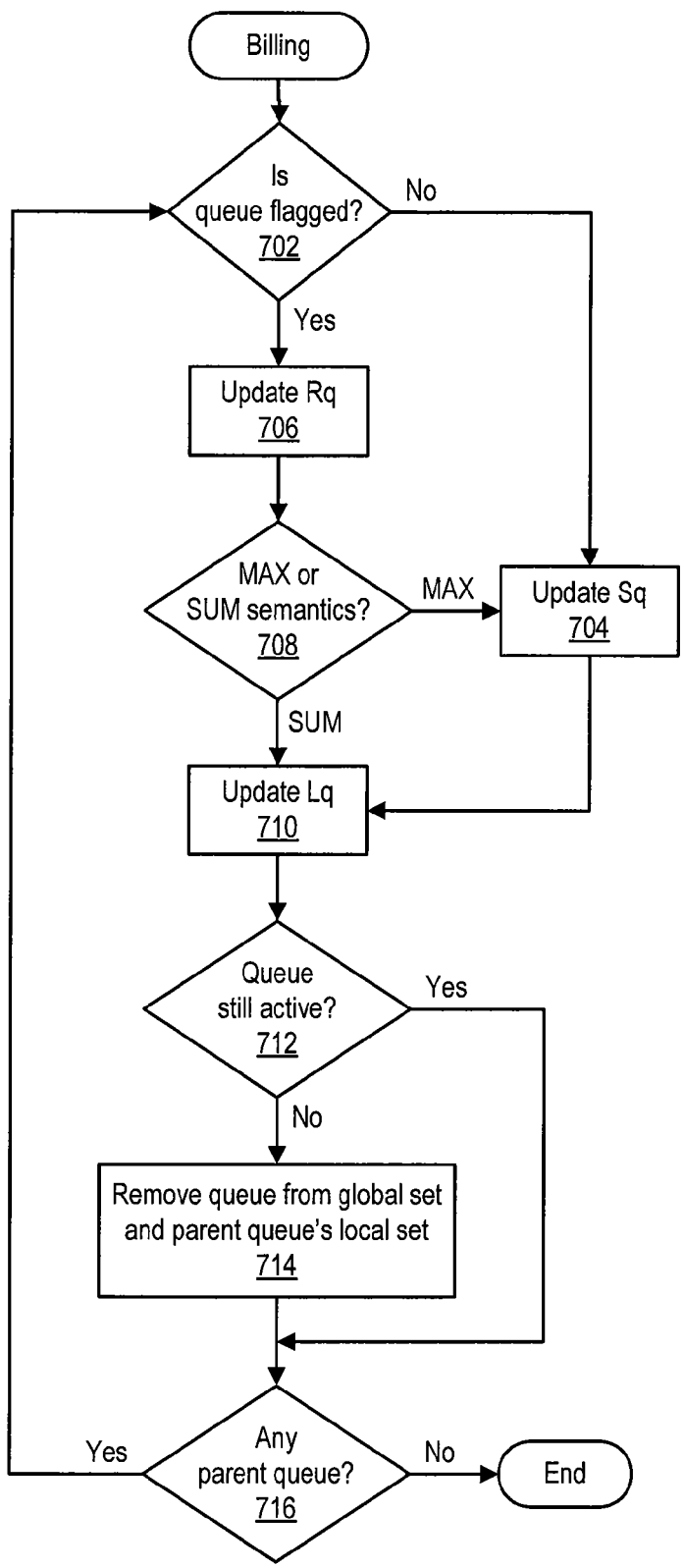
FIG. 7 is a flow diagram that depicts the steps of a method for updating tracking data of queues when a packet is scheduled for transmission, according to an embodiment.

A method of allocating network bandwidth according to embodiments can be separated into a method for queuing packets for scheduling as shown in FIG. 3, a method for activating queues as shown in FIG. 4, a method for scheduling a packet for transmission as shown in FIG. 5, and a method for selecting a queue from which a packet will be scheduled for transmission as shown in FIG. 6. When a packet is scheduled for transmission, packet scheduler 137 updates the tag values that are maintained for the leaf node corresponding to the admitted packet and also the tag values that are maintained for ancestor queues of the leaf queue as shown in FIG. 7. FIGS. 8A-8F are pseudo codes corresponding to the methods of FIGS. 3-7.

According to embodiments, when a new packet is received at step 302, packet scheduler 137 at step 304 adds the packet to the leaf queue associated with the VM that is requesting the packet transmission. If this queue is idle as determined at step 306, it is activated at step 308. Then, at step 310, packet scheduler 137 starts a new cycle for scheduling packets for transmission according to the method shown in FIG. 5. If, at step 306, the queue is determined to be already active, step 310 is executed after such determination without passing through step 308. It should be recognized that the receipt of any packet for transmission from any VM will cause the scheduling of packets for transmission according to the method shown in FIG. 5 to be triggered.

The queue activation at step 308 is detailed in FIG. 4. At step 402, packet scheduler 137 initializes the reservation tag, the limit tag, and the share tag that are being tracked for the queue. The reservation tag and the limit tag are initialized with the maximum of the previous value and the current time so that the newly activated queue can be synchronized with currently active queues, and so that packet scheduler 137 does not starve the currently active queues as a result of an old reservation tag being assigned to the newly activated queue. For the share tag, packet scheduler 137 uses virtual time instead of real time for synchronization. Virtual time may be used for synchronization of the share tag because absolute bandwidth allocation is not imposed by the share setting. In the example shown, packet scheduler 137 initializes the share tag of the newly activated queue to be the minimum share tag among the active siblings queues.

At step 404, packet scheduler 137 adds the activated queue to a global set of queues (referred to as global minHeap in the pseudo-code) that is later used in selecting a queue from which a packet will be de-queued and scheduled for transmission through pNIC 150. In addition, packet scheduler 137 adds the activated queue to a local set of queues (referred to as shares and limit minHeap in the pseudo-code) maintained by a parent queue of the activated queue. Then, at steps 406 and 408, packet scheduler 137 activates the parent queue if it is idle. If the parent queue is to be activated, the flow returns to step 402. If the parent queue is already active, the method terminates. Although a global minHeap is used in the embodiment described herein for better accuracy and more fine-grained allocation of network bandwidth against reservations, other embodiments may be implemented with a local reservation minHeap per node in the hierarchy.

FIG. 5 shows the steps of a method for scheduling a packet for transmission according to an embodiment. As described above, this method is triggered when a packet is added to any of the leaf queues. When this method is triggered, packet scheduler 137 first confirms at step 502 whether or not pNIC 150 is currently being used at full capacity. In one embodiment, packet scheduler 137 determines that pNIC 150 is being used at full capacity if the number of bytes that have been scheduled during the prior N μsec period (e.g., 160 μsec) is greater than the maximum number of bytes that can be scheduled during that period. If it is, packet scheduler 137 waits one cycle (step 504) before checking again. The time period for one cycle is equal to the "interrupt coalescing" time period of pNIC 150. "Interrupt coalescing" is a technique implemented in pNIC 150 to reduce the number of interrupts associated with network packet transmission (and reception) by collecting packets over a predefined time period and generate a single interrupt for handling transmission (and reception) of the collected packets at the end of each such time period. This predefined time period is the "interrupt coalescing" time period and is equal to 20 μsec in one implementation.

If packet scheduler 137 determines at step 502 that pNIC 150 is not currently being used at full capacity, packet scheduler 137 at step 506 finds an eligible queue from which a packet will be scheduled for transmission according to the method of FIG. 6. If no eligible queue is found, the method terminates. If an eligible queue is found, the first (i.e., oldest) packet in the eligible queue is de-queued (retrieved from the queue and removed from the queue) at step 510. Then, packet scheduler 137 at step 512 bills for scheduling this packet for transmission according to the method of FIG. 7. The billing is performed in a bottom-up manner, first for the eligible queue found at step 508 and then for its parent queue and other ancestor queues (if any). After the billing, at step 514, packet scheduler 137 sends the packet to pNIC 150 for transmission.

FIG. 6 shows the steps of a method for selecting a queue from which a packet will be scheduled for transmission according to an embodiment. The method begins at step 602 where packet scheduler 137 examines the global set of active queues and determines if there are any queues with eligible reservation tag values and limit tag values. An eligible reservation tag value is one that is less than or equal to the current time value, indicating that the corresponding queue has not yet been allocated bandwidth up to its reservation. Similarly, an eligible limit tag value is one that is less than or equal to the current time value, indicating that bandwidth allocated to the corresponding queue has not yet exceeded its limit. If there are no queues with eligible reservation tag values and limit tag values, packet scheduler 137 selects the root queue at step 604 and proceeds to step 608.

On the other hand, if there is at least one queue with eligible reservation tag values and limit tag values, packet scheduler 137 at step 606 selects the queue with the minimum reservation tag value, and flags the selected queue and all ancestor queues of the selected queue as "eligible for reservation." This flag is used in the method of FIG. 7 as described below. Step 608 is then executed.

At step 608, packet scheduler 137 determines if the selected queue is a leaf queue. If so, at step 610, packet schedule returns the selected queue for scheduling according to the method of FIG. 5. If not, packet scheduler 137 at step 612 examines the selected queue's local set of active queues and determines if there are any queues with eligible limit tag values. An eligible limit tag value is one that is less than or equal to the current time value, indicating that bandwidth allocated to the corresponding queue has not yet exceeded its limit. If there are no queues with eligible limit tag values, packet scheduler 137 does not return any queues for scheduling according to the method of FIG. 5. On the other hand, if there is at least one queue with eligible limit tag values, packet scheduler 137 selects the queue with the lowest share tag value at step 616 and returns to step 608. The selection of the lowest share tag value ensures that, among sibling queues, the one with the highest priority gets selected before the others.

FIG. 7 shows the steps of a method for updating tracking data of queues when a packet is scheduled for transmission. The method begins at step 702, where packet scheduler 137 examines whether the queue has been flagged as "eligible for reservation." If not, it is determined that bandwidth allocation was made based on relative shares and not based on reservation. Therefore, step 704 is executed, where packet scheduler 137 updates the share tag value for the queue, using the formula: (new share tag value)=(old share tag value)+(length of packet scheduled for transmission)/(share setting for the queue). If packet scheduler 137 at step 702 determines that the queue has been flagged as "eligible for reservation," it updates the reservation tag value for the queue, using the formula: (new reservation tag value)=(old reservation tag value)+(length of packet scheduled for transmission)/(reservation setting for the queue).

At step 708, packet scheduler 137 examines a user configuration setting to determine which of the two semantics, the MAX semantic or the SUM semantic, has been specified. If the SUM semantic is specified, step 710 is executed next. If the MAX semantic is specified, step 704, described above, is executed and then step 710 is executed thereafter. At step 710, packet scheduler 137 updates the limit tag value for the queue, using the formula: (new limit tag value)=(old limit tag value)+(length of packet scheduled for transmission)/(limit setting for the queue).

At step 712, packet scheduler 137 determines if the queue is still active. A leaf queue is no longer active if its last packet has been scheduled for transmission. An intermediate queue is no longer active if none of its child queues are active. If the queue is no longer active, step 714 is executed, where packet scheduler 137 removes the queue from the global set of active queues, and its parent's local set of active queues. Step 716 is executed thereafter. At step 716, packet scheduler 137 determines if there is a parent queue of the just-processed queue. If so, the flow returns to step 702 for processing of the parent queue. If not, the method terminates. Returning to step 712, if packet scheduler 137 determines that the queue is still active, step 714 is skipped and step 716 is executed after step 712 in the manner described above.

Additional embodiments implement optimizations in packet scheduler 137 to minimize the runtime overhead of the hierarchical scheduling method described above.

In one embodiment, packet scheduler 137 makes the limit tag value of a parent queue to be equal to the maximum of its own limit tag value and the lowest limit tag values among its active child queues. If a child queue does not have any maximum bandwidth constraint then its limit tag value is considered 0. This embodiment prevents the situation where a parent queue is found eligible for scheduling but none of its child queues are.

In another embodiment, a locking model that employs a two-step activation mechanism is implemented. In this model, hypervisor 139 maintains a dedicated list for pending queue activations for each intermediate queue. When a queue is activated, the queue is added to its parent queue's activation pending list instead of automatically adding the queue to the parent queue's local set (see step 404). Then, packet scheduler 137 adds the queues in a parent queue's activation pending list to the parent queue's local set only as the corresponding parent queue is selected for scheduling in accordance with the methods described above.

For small message sizes, such as 256 bytes, it may be too costly to go through the hierarchy and update all the relevant tags on a per packet basis. Therefore, in another embodiment, when packet scheduler 137 selects an eligible leaf queue, packet scheduler 137 will schedule packets from this same queue until it reaches a predetermined size (e.g., 10 KB) worth of payload. It has been observed that such degree of batching does not impact fairness at the macro scale but it does boost performance quite significantly.

Further embodiments are directed to methods to handle over-committed scenarios where the total reservation exceeds the total available capacity. This can happen irrespective of admission control due to the nature of variability in throughput. For instance, an upstream switch (e.g., virtual switch 138) might issue some pause notifications while trying to address some severe contention or a faulty hardware might force the link speed to decrease. More commonly, insufficient hardware capabilities might impact the ability to achieve the maximum link capacity. Therefore, in one embodiment, no more than 75% of the maximum link capacity is reserved. Beyond this utilization, the link performance might not be as deterministic due to the reasons mentioned above.

In another embodiment, to handle the capacity fluctuations during overcommitted situations, a high reservation value is set for each leaf queue in the hierarchy (e.g., total of 16 Gbps reservation for a 10 Gbps link) so that packet scheduler 137 performs bandwidth allocation based on relative ratio of reservations. It should be recognized that, in this environment, the reservation tag of each leaf queue lags behind the physical time due to the delay in meeting reservations. Normally, this is not an issue as long as each leaf queue stays active since the requests will be served in the order that follows the reservation-based ratio. An issue however arises when one of the leaf queues becomes idle for some time. When such a leaf queue becomes active again, packet scheduler 137 will adjust the reservation tag of this leaf queue to the current time, T, as described above (step 402). Since other leaf queues are running behind, the newly activated leaf queue will be denied service until the other active leaf queues catches up to T. This starvation issue can be addressed by setting the initial value for the reservation tag of the newly activated leaf queues as the maximum of (1) its previous value and (2) a minimum of the current time, T, and the reservations tags of all active leaf queues.

Embodiments described herein feature virtual machines as the network bandwidth consumers. In other embodiments, the network bandwidth consumer may be a management agent running inside a physical machine that communicates with a management server, a migration module running in the hypervisor that manages live migration of virtual machines between physical machines or migration of virtual disks between data stores, NFS (Network File System) drivers, and iSCSI (Internet Small Computer System Interface) drivers.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media (e.g., tangible computer readable storage media). The term computer readable medium (e.g., tangible computer readable storage medium) refers to any data storage device that can store data which can thereafter be input to a computer system computer readable media and may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of allocating network bandwidth to consumers of the network bandwidth according to a node hierarchy that includes a root node, intermediate nodes, and leaf nodes, wherein each leaf node represents a queue of packet transmission requests from one of the consumers and each intermediate node represents a grouping of one or more leaf queues, the method comprising:
   queuing data packets for transmission in the leaf nodes;
   selecting a leaf node from which a data packet is to be transmitted based on bandwidth allocation data of the nodes, the bandwidth allocation data of the nodes including tracking data that represent how much network bandwidth has been allocated to the nodes; and
   upon selecting the leaf node, updating the tracking data of the selected leaf node and the tracking data of an intermediate node that is a parent node of the selected leaf node, and issuing a command to transmit the data packet of the selected leaf node.

2. The method of claim 1, further comprising:
   upon selecting the leaf node, removing the data packet to be transmitted from the selected leaf node.

3. The method of claim 1, wherein the bandwidth allocation data further include a bandwidth reservation for each of the leaf nodes, and when selecting the leaf node, the bandwidth reservation of the selected leaf node has not yet been satisfied.

4. The method of claim 3, wherein the tracking data of a leaf node include a running reserved bandwidth total for the leaf node that indicates how much total reserved bandwidth has been allocated to the leaf node during a prior time interval of a predefined length, and when the leaf node is selected, the running reserved bandwidth total of the selected leaf node is less than or equal to the bandwidth reservation of the selected leaf node.

5. The method of claim 4, wherein said updating includes updating the running reserved bandwidth total for the selected leaf node.

6. The method of claim 4, wherein said updating includes updating the running reserved bandwidth total for the selected leaf node and a running reserved bandwidth total of at least one ancestor node of the selected leaf node.

7. The method of claim 4, wherein the bandwidth allocation data further include a bandwidth limit for each of the leaf nodes, and when selecting the leaf node, the bandwidth limit of the selected leaf node has not yet been exceeded.

8. The method of claim 1, wherein the tracking data of each of the leaf nodes include a running share total that indicates a bandwidth allocation priority that is to be given to the respective leaf node relative to other node or nodes sharing the same intermediate node as a parent node during a prior time interval of a predefined length, and when the leaf node is selected, the running share total of the selected leaf node is less than or equal to each of the running share total of the other node or nodes.

9. The method of claim 8, wherein the tracking data of each of the leaf nodes and the intermediate nodes include a running bandwidth total that indicates how much total bandwidth has been allocated to the respective node during the prior time interval of the predefined length, and said updating includes updating the running bandwidth total for the selected leaf node and updating the running bandwidth total for all intermediate nodes that are ancestor nodes of the selected leaf node.

10. The method of claim 9, wherein the bandwidth allocation data further include a bandwidth limit for each of the nodes, and when selecting the leaf node, none of the bandwidth limits of the selected leaf node and all the intermediate nodes that are ancestor nodes of the selected leaf node have not yet been exceeded.

11. A computer system having one or more network interface controllers (NICs) and virtual machines running therein that share the NICs and a packet scheduler for allocating network bandwidth available through the NICs to the virtual machines according to a node hierarchy that includes a root node, intermediate nodes, and leaf nodes, wherein each leaf node represents a queue of packet transmission requests from one of the virtual machines and each intermediate node represents a grouping of one or more leaf queues, and the packet scheduler is configured to perform a method comprising the steps of:

queuing data packets for transmission in the leaf nodes;
selecting a leaf node from which a data packet is to be transmitted based on bandwidth allocation data of the nodes, the bandwidth allocation data of the nodes including tracking data that represent how much network bandwidth has been allocated to the nodes; and
upon selecting the leaf node, updating the tracking data of the selected leaf node and the tracking data of an intermediate node that is a parent node of the selected leaf node, and issuing a command to transmit the data packet of the selected leaf node.

12. The computer system of claim 11, wherein
the bandwidth allocation data further include a bandwidth reservation for each of the leaf nodes and a bandwidth limit for each of the leaf nodes, and
when selecting the leaf node, the bandwidth reservation of the selected leaf node has not yet been satisfied and the bandwidth limit of the selected leaf node has not yet been exceeded.

13. The computer system of claim 12, wherein said updating includes updating the running reserved bandwidth total for the selected leaf node and a running reserved bandwidth total for at least one intermediate node that is an ancestor node of the selected leaf node.

14. The computer system of claim 11, wherein the tracking data of each of the leaf nodes include a running share total that indicates a bandwidth allocation priority that is to be given to the respective leaf node relative to other node or nodes sharing the same intermediate node as a parent node during a prior time interval of a predefined length, and when selecting the leaf node, the running share total of the selected leaf node is less than or equal to each of the running share total of the other node or nodes.

15. The computer system of claim 14, wherein the bandwidth allocation data further include a bandwidth limit for each of the leaf nodes, and when selecting the leaf node, the bandwidth limit of the selected leaf node has not yet been exceeded.

16. A non-transitory computer readable medium comprising instructions to be executed in a computer system having one or more network interface controllers (NICs) and processes running therein that share the NICs and a packet scheduler for allocating network bandwidth available through the NICs to the virtual machines according to a node hierarchy that includes a root node, intermediate nodes, and leaf nodes, wherein each leaf node represents a queue of packet transmission requests from one of the processes and each intermediate node represents a grouping of one or more leaf queues, and the packet scheduler is configured to perform a method comprising the steps of:

queuing data packets for transmission in the leaf nodes;
selecting a leaf node from which a data packet is to be transmitted based on bandwidth allocation data of the nodes, the bandwidth allocation data of the nodes including tracking data that represent how much network bandwidth has been allocated to the nodes; and
upon selecting the leaf node, updating the tracking data of the selected leaf node and the tracking data of an intermediate node that is a parent node of the selected leaf node, and issuing a command to transmit the data packet of the selected leaf node.

17. The non-transitory computer readable medium of claim 16, wherein
the bandwidth allocation data further include a bandwidth reservation for each of the leaf nodes and a bandwidth limit for each of the leaf nodes, and
when selecting the leaf node, the bandwidth reservation of the selected leaf node has not yet been satisfied and the bandwidth limit of the selected leaf node has not yet been exceeded.

18. The non-transitory computer readable medium of claim 17, wherein said updating includes updating the running reserved bandwidth total for the selected leaf node and a running reserved bandwidth total for at least one intermediate node that is an ancestor node of the selected leaf node.

19. The non-transitory computer readable medium of claim 16, wherein the tracking data of each of the leaf nodes include a running share total that indicates a bandwidth allocation priority that is to be given to the respective leaf node relative to other node or nodes sharing the same intermediate node as a parent node during a prior time interval of a predefined length, and when selecting the leaf node, the running share total of the selected leaf node is less than or equal to each of the running share total of the other node or nodes.

20. The non-transitory computer readable medium of claim 19, wherein the bandwidth allocation data further include a bandwidth limit for each of the leaf nodes, and when selecting the leaf node, the bandwidth limit of the selected leaf node has not yet been exceeded.

* * * * *